United States Patent
Horton

(10) Patent No.: US 9,948,359 B2
(45) Date of Patent: Apr. 17, 2018

(54) SECONDARY SHORT-RANGE WIRELESS ASSIST FOR WIRELESS-BASED ACCESS CONTROL

(71) Applicant: AT&T Intellectual Property I, L.P., Atlanta, GA (US)

(72) Inventor: Mike Horton, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 228 days.

(21) Appl. No.: 14/032,280

(22) Filed: Sep. 20, 2013

(65) Prior Publication Data

US 2015/0084736 A1  Mar. 26, 2015

(51) Int. Cl.
*B60R 25/00* (2013.01)
*G05B 19/00* (2006.01)
(Continued)

(52) U.S. Cl.
CPC . *H04B 5/0056* (2013.01); *G07C 2009/00388* (2013.01); *G07C 2009/00769* (2013.01);
(Continued)

(58) Field of Classification Search
CPC ............ G07C 9/00309; G07C 9/00571; G07C 2209/04; G07C 2209/64;
(Continued)

(56) References Cited

U.S. PATENT DOCUMENTS

| 6,720,874 B2 * | 4/2004 | Fufido ............... G07C 9/00031 340/5.2 |
| 7,378,939 B2 | 5/2008 | Sengupta et al. |

(Continued)

OTHER PUBLICATIONS

Elisa Bertino and Michael Kirkpatrick, "Location-Aware Authentication and Access Control—Concepts and Issues," 2009 International Conference on Advanced Information Networking and Applications, 2009, pp. 10-15, Advanced Information Networking and Applications.

(Continued)

*Primary Examiner* — Emily C Terrell
(74) *Attorney, Agent, or Firm* — Hartman & Citrin LLC

(57) ABSTRACT

Concepts and technologies disclosed herein are directed to secondary short-range wireless assist for wireless-based access control. According to one aspect, a method can include receiving, at an access control system, a first identifier via a near-field communications ("NFC") reader associated with an entryway to an area. The NFC reader can receive the first identifier from an NFC component of a mobile device. The method can include receiving, at the access control system, a second identifier via a wireless transceiver associated with the area. The wireless transceiver associated with the area can receive the second identifier from a wireless communication component of the mobile device after the mobile device has entered the area through the entryway. The method can also include determining, by the access control system, that the first identifier and the second identifier constitute an authentication pair that identifies the mobile device as being authenticated to access the area.

8 Claims, 11 Drawing Sheets

(51) Int. Cl.
*G05B 23/00* (2006.01)
*G06F 7/00* (2006.01)
*G08B 29/00* (2006.01)
*H04B 1/00* (2006.01)
*H04Q 1/00* (2006.01)
*H04B 5/00* (2006.01)
*G07C 9/00* (2006.01)

(52) U.S. Cl.
CPC ........ *G07C 2209/63* (2013.01); *H04B 5/0031* (2013.01); *H04B 5/0037* (2013.01)

(58) Field of Classification Search
CPC ...... G07C 2009/00412; G07C 9/00111; G07C 2009/00865; G07C 9/00174; G07C 9/00904; G07C 2009/00317; G07C 2009/00333; G07C 9/00103; G07C 9/00857; G07C 9/00031; G07C 9/00182; G07C 9/00
USPC ............ 340/5.7, 5.61, 5.5, 10.1–10.52, 12.5, 340/13.25
See application file for complete search history.

(56) References Cited

U.S. PATENT DOCUMENTS

| | | | |
|---|---|---|---|
| 7,382,895 B2 * | 6/2008 | Bramblet | G07C 9/00 382/103 |
| 7,984,064 B2 | 7/2011 | Fusari | |
| 8,090,364 B2 | 1/2012 | Delalet | |
| 8,112,066 B2 | 2/2012 | Ben Ayed | |
| 8,165,525 B2 | 4/2012 | Eisenbach | |
| 8,396,452 B1 | 3/2013 | Matsuoka | |
| 8,467,770 B1 | 6/2013 | Ben Ayed | |
| 8,494,576 B1 | 7/2013 | Bye et al. | |
| 2003/0151493 A1 * | 8/2003 | Straumann | G07C 9/00015 340/5.25 |
| 2009/0210940 A1 | 8/2009 | Dean | |
| 2010/0201482 A1 * | 8/2010 | Robertson et al. | 340/5.61 |
| 2011/0202466 A1 | 8/2011 | Carter | |
| 2011/0291798 A1 * | 12/2011 | Schibuk | 340/5.61 |
| 2012/0146918 A1 | 6/2012 | Kreiner et al. | |
| 2012/0154115 A1 * | 6/2012 | Herrala | 340/5.64 |
| 2012/0280790 A1 * | 11/2012 | Gerhardt et al. | 340/5.61 |
| 2013/0091537 A1 | 4/2013 | Parla et al. | |
| 2013/0145457 A1 | 6/2013 | Papakipos et al. | |
| 2013/0169815 A1 * | 7/2013 | Carney | H04L 63/0853 348/156 |
| 2013/0237193 A1 * | 9/2013 | Dumas et al. | 455/414.1 |
| 2014/0070919 A1 * | 3/2014 | Jackson | G08C 17/02 340/5.61 |

OTHER PUBLICATIONS

Cynthia Kuo, Jesse Walker, and Adrian Perrig, "Low-Cost Manufacturing, Usability, and Security: An Analysis of Bluetooth Simple Pairing and Wi-Fi Protected Setup," Financial Cryptography and Data Security, 2007, pp. 325-340.

Hossein Rahimi, "An Indoor Geo-Fencing Based Access Control System for Wireless Networks," Jul. 2013.

* cited by examiner

SECONDARY SHORT-RANGE WIRELESS ASSIST FOR WIRELESS-BASED ACCESS CONTROL

BACKGROUND

The concepts and technologies disclosed herein generally relate to authentication technologies for access control. More specifically, the concepts and technologies disclosed herein relate to secondary short-range wireless assist for wireless-based access control.

Near-field communications ("NFC") is an inductive coupling technology that allows inductive circuits to share power and data over a distance of a few centimeters. Some mobile devices, such as smartphones, use an NFC component to enable communications with other NFC devices. For example, a smartphone equipped with an NFC component can connect to a payment terminal to facilitate a contactless payment transaction. In this manner, payments can be made without the need for a physical credit card, debit card, or cash. NFC is also used in a variety of other applications.

SUMMARY

Concepts and technologies disclosed herein are directed to secondary short-range wireless assist for wireless-based access control. According to one aspect disclosed herein, NFC technology is utilized in combination with a secondary wireless technology, such as, but not limited to, BLUETOOTH, BLUETOOTH low energy, ZIGBEE, or WI-FI, for physical access control to an area. According to another aspect disclosed herein, NFC technology is utilized in combination with a secondary wireless technology for information access control to a computing device. According to another aspect disclosed herein, NFC technology is utilized in combination with a secondary wireless technology for information access control to a vehicle and/or components thereof. Although embodiments disclosed herein are primarily described in context of NFC technologies as a primary access control mechanism in combination with a short-range wireless technology, such as, but not limited to, BLUETOOTH, BLUETOOTH low energy, ZIGBEE, or WI-FI, as a secondary access control mechanism, additional embodiments in which both the primary and the secondary access control mechanisms utilize a short-range wireless technology, such as, but not limited to, BLUETOOTH, BLUETOOTH low energy, ZIGBEE, or WI-FI are contemplated.

According to one aspect of the concepts and technologies disclosed herein, a method is disclosed. The method can include receiving, at an access control system, a first identifier via an NFC reader associated with an entryway to an area. The NFC reader can receive the first identifier from an NFC component of a mobile device. The method can include receiving, at the access control system, a second identifier via a wireless transceiver associated with the area. The wireless transceiver associated with the area can receive the second identifier from a wireless communication component of the mobile device after the mobile device has entered the area through the entryway. The method can also include determining, by the access control system, that the first identifier and the second identifier constitute an authentication pair, where the authentication pair identifies the mobile device as being authenticated to access the area.

In some embodiments, the method can also include receiving, at the access control system, a third identifier via the wireless transceiver associated with the area, wherein the wireless transceiver associated with the area receives the third identifier from a further wireless communication component of a further mobile device; and determining, by the access control system, that a fourth identifier was not received via the near field communication reader. The fourth identifier and the third identifier may constitute a second authentication pair, and the second authentication pair identifies the further mobile device as being authenticated to access the area. The mobile device may be associated with a user and the further mobile device may be associated with a further user. The further user may attempt to access the area by tailgating the user through the entryway to the area. In some embodiments, the method can also include storing a flag in association with the further mobile device and the further user in a user database. The further user may be reprimanded as a result of the flag.

In some embodiments, the method can also include generating a wireless component activation signal, and causing the wireless component activation signal to be sent to the mobile device to cause the mobile device to activate the wireless communication component. The wireless component activation signal may be generated in response to detecting that the mobile device has traversed a geo-fence border. Alternatively, the wireless component activation signal may be generated in response to receiving the first identifier via the near field communication reader.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
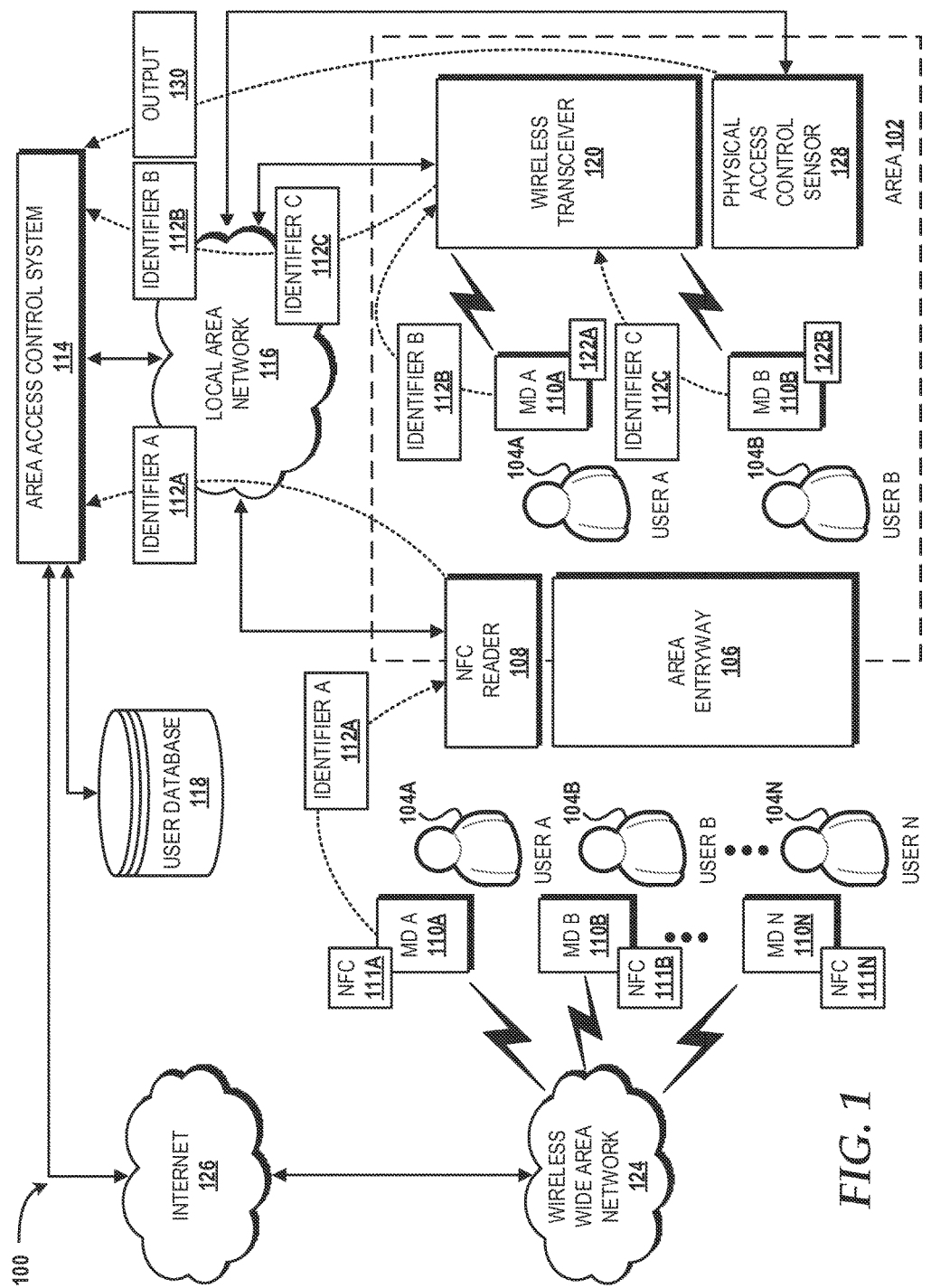
FIG. 1 is a block diagram illustrating aspects of an illustrative operating environment for various concepts disclosed herein.

The following detailed description is directed to secondary short-range wireless assist for wireless-based access control. According to one aspect disclosed herein, near-field communications ("NFC") technology is utilized in combination with a secondary wireless technology, such as, but not limited to, BLUETOOTH, BLUETOOTH low energy, ZIGBEE, or WI-FI, for physical access control to an area. According to another aspect disclosed herein, NFC technology is utilized in combination with the secondary wireless technology for information access control to a computing device. According to another aspect disclosed herein, NFC technology is utilized in combination with a secondary wireless technology for information access control to a vehicle and/or components thereof. Although embodiments disclosed herein are primarily described in context of NFC technologies as a primary access control mechanism in combination with a short-range wireless technology, such as, but not limited to, BLUETOOTH, BLUETOOTH low energy, ZIGBEE, or WI-FI, as a secondary access control mechanism, additional embodiments in which both the primary and the secondary access control mechanisms utilize a short-range wireless technology, such as, but not limited to, BLUETOOTH, BLUETOOTH low energy, ZIGBEE, or WI-FI are contemplated.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer system configurations, including hand-held devices, mobile devices, wireless devices, multiprocessor systems, distributed computing systems, microprocessor-based or programmable consumer electronics, minicomputers, mainframe computers, routers, switches, other computing devices described herein, and the like.

In the following detailed description, references are made to the accompanying drawings that form a part hereof, and in which are shown by way of illustration specific embodiments or examples. Referring now to the drawings, in which like numerals represent like elements throughout the several figures, example aspects of secondary short-range wireless assist for wireless-based access control will be presented.

Referring now to FIG. 1, aspects of an operating environment 100 for various embodiments of the concepts and technologies disclosed herein for secondary short-range wireless assist for wireless-based access control will be described, according to an illustrative embodiment. The operating environment 100 shown in FIG. 1 includes an area 102 to which physical access by one or more users 104A-104N (referred to herein generally as "users 104") is to be controlled. The area 102 may be an indoor area or an outdoor area. For example, an indoor area might be a building, a temporary structure such as a tent, or an area within a building or temporary structure. An outdoor area might be a park, a parking lot, or any other outdoor area. It should be understood that the area 102 can have any dimensions and is not restricted to areas that may be purely defined as indoor or outdoor but a combination of indoor and outdoor areas.

Access to the area 102 may be provided at least in part via one or more area entryways (shown generally as "area entryway 106"). The area entryway 106 might be a door, a turnstile, a gate, a revolving door, or the like. It should be understood, however, that the area entryway 106 might not be defined by a physical barrier, and as such, the aforementioned examples should not be construed as being limiting in any way.

The area entryway 106 may include, may be, or may communicate with an NFC reader 108. The NFC reader 108 may be dedicated to the area entryway 106 or may be in communication with a plurality of area entryways that provide access to the area 102 and/or a plurality of areas.

The NFC reader 108 includes an inductive circuit that when placed in close proximity (e.g., within a few centimeters) of another NFC-enabled device causes the NFC reader 108 and the other NFC device to power-up to facilitate the transfer of data between the NFC reader 108 and the other NFC device. In the illustrated embodiment, each of the users 104 is associated with a mobile device 110, such as one of the mobile devices 110A-110N (referred to herein generally as "mobile devices 110"), such as a smartphone, a tablet device, a portable media player, or a portable video game system, and each of the mobile devices 110 includes an NFC component 111, such as one of the NFC components 111A-111N (referred to herein generally as "NFC components 111") that can transfer data from the mobile device 110 to the NFC reader 108. In particular, a user A 104A is associated with a mobile device A 110A that includes an NFC component A 111A, a user B 104B is associated with a mobile device B 110B that includes an NFC component B 111B, and a user N 104N is associated with a mobile device 110N that includes an NFC component N 111N.

In the illustrated example, the NFC component 111A of the mobile device A 110A sends an identifier A 112A to the NFC reader 108 when the NFC component A 111A is placed in close proximity (e.g., within a few centimeters) of the NFC reader 108. In response, the NFC reader 108 sends the identifier A 112A to an area access control system 114 via a local area network ("LAN") 116. The area access control system 114 can compare the identifier A 112A to one or more identifiers stored in a user database 118. If the area access control system 114 determines that the user database 118 stores the identifier A 112A, the area access control system 114 can cause the area entryway 106 to be traversable by the user A 104A. For example, the area access control system 114 may cause a locking mechanism to release so as to allow the user A 104A entry to the area 102 through the area entryway 106. It should be understood that the locking mechanism is one non-limiting example, and as such, should not be construed as being limiting in any way.

The LAN 116 may be a wired and/or wireless LAN. The LAN 116 may operate using one or more Institute of Electrical and Electronic Engineers ("IEEE") standards such as IEEE 802.3, IEEE 802.11a, 802.11b, 802.11g, 802.11n, and/or future 802.11 standard (referred to herein collectively as "WI-FI").

In some instances, one or more individuals may follow the user A 104A through the area entryway 106. This action is referred to herein as "tailgating." A tailgating individual may do so maliciously or innocently; however, tailgating may pose security concerns or risks whether or not the tailgating is done maliciously. For example, a building that requires security clearance may be required to enforce a security policy that closely monitors all incoming and outgoing individuals, which may have different security clearances to the area 102 or particular sub-areas of the area 102. As such, a tailgating individual may need to be flagged and possibly reprimanded for not properly entering the area 102 by scanning his or her mobile device at the NFC reader 108. In some instances, a tailgating individual may be authorized (i.e., the individual has security clearance) to enter the area 102, but for one reason or another the individual has decided not to provide his or her authentication credential(s) via the NFC reader 108. In other instances the tailgating individual is not authorized to enter the area 102 and is simply trying to circumvent the NFC reader 108 to gain access to the area 102—again, the individual may do so with or without malicious intent.

In the illustrated example, the user B 104B has tailgated the user A 104A through the area entryway 106 into the area 102. After the user A 104A, the mobile device A 110A, the user B 104B, and the mobile device B 110B enter the area 102, a wireless transceiver 120 located within the area 102 can generate a request for an additional identifier directed to the mobile device A 110A and the mobile device B 110B. It should be understood that other mobile devices located within the area 102 may also receive the request, such that, in effect, the wireless transceiver 120 broadcasts the request.

The request for an additional identifier can prompt a wireless component A 122A of the mobile device A 110A to send an identifier B 112B to the wireless transceiver 120. The request for an additional identifier can also prompt a wireless component B 122B of the mobile device B 110B to send an identifier C 112C to the wireless transceiver 120. The wireless components 122A, 122B and the wireless transceiver 120 can communicate using a wireless communication technology, such as, for example, BLUETOOTH, BLUETOOTH low energy, ZIGBEE, or WI-FI. The wireless transceiver 120 can send the identifier B 112B and the identifier C 112C to the area access control system 114 via the LAN 116. The area access control system 114 can utilize the identifier B 112B and the identifier C 112C to determine whether a corresponding identifier of an authentication pair was received from the NFC reader 108.

In the illustrated example, the identifier C 112C is received from the mobile device B 110B, but an identifier was not received from the mobile device B 110B at the area entryway 106 via the NFC reader 108. As such, the area access control system 114 determines that the user B 104B has entered the area 102 through the area entryway 106 without first scanning the NFC component 111B with the NFC reader 108. In other words, the user B 104B likely tailgated the user A 104A through the area entryway 106.

In some embodiments, the area access control system 114 can flag the user B 104B and the associated mobile device B 110B as failing to comply with a policy regarding proper entry into the area 102 by scanning in via the NFC reader 108. The flag may be stored in association with the user B 104B in the user database 118. It is contemplated that the flag or subsequent flags for a repeat offense may lead to the user B 104B being reprimanded in some way. For example, the user B 104B may be warned of their policy violation via email, text message, telephone call, or in-person. A policy violation warning may be sent to the mobile device B 110B in time for the user B 104B to correct his or her mistake of not scanning at the NFC reader 108.

In some embodiments, the wireless component 122A of the mobile device A 110A and/or the wireless component 122B of the mobile device B 110B is remotely activated. Remote activation of the wireless components 122A, 122B may occur at the area entryway 106, where the NFC reader 108, the area access control system 114, and/or another device (not shown) generates a wireless component activation signal, which is sent to all or at least a portion of the devices that are within a predefined distance of the area entryway 106, after all or at least a portion of the devices are within the area 102, or when all or at least a portion of the devices are within a communication distance of the wireless transceiver 120, wherein the communication distance is dictated by the wireless technology utilized by the wireless transceiver 120. For example, BLUETOOTH may have a communication distance of a few feet, whereas WI-FI may have a communication distance of a few hundred feet.

Remote activation of the wireless components 122A, 122B may additionally or alternatively be based upon a geo-fence defined around the area entryway 106. The geo-fence may be created by a carrier associated with a wireless wide area network ("WWAN") for one or more of the users 104 at the request of one or more of the users 104 and/or the area access control system 114. The area access control system 114 can communicate with the WWAN 124 via a network, such as an internet 126 to receive geo-fence information, such as, for example, location information that defines a perimeter around an area, which may include the area entryway 106 and/or the area 102 and potentially some distance away from the area entryway 106 and/or the area 102. The geo-fence may be defined using a location-based service provided at least in part via the WWAN 124 using global positioning system ("GPS") technology, cellular triangulation, WI-FI triangulation, and/or other location determining techniques known to those skilled in the art.

The WWAN 124 may be or may include a mobile telecommunications network utilizing one or more mobile telecommunications technologies. The mobile telecommunications technologies can include, but are not limited to, Global System for Mobile communications ("GSM"), Code Division Multiple Access ("CDMA") ONE, CDMA2000, Universal Mobile Telecommunications System ("UMTS"), Long Term Evolution ("LTE"), and Worldwide Interoperability for Microwave Access ("WiMAX"). Moreover, the WWAN 124 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The WWAN 124 may be configured to provide voice and/or data communications with any combination of the above technologies. The WWAN 124 may be configured to or adapted to provide voice and/or data communications in accordance with future generation technologies.

In addition to or as an alternative to the wireless transceiver 120, the area 102 can include a physical access control sensor 128. In some embodiments, the physical access control sensor 128 includes a camera. The camera may be monitored by security personnel who can manually flag an individual that did not scan in via the NFC reader 108. The camera can additionally or alternatively include functionality to enable head detection for use in detecting the presence of the head of the users 104 when the users 104 are within the area 102. The head detection may be accompanied by a facial recognition technology to identify the individual(s) associated with the head(s) detected by the camera. The camera may additionally or alternatively provide motion sensing functionality, which may be utilized to isolate the number of individuals within the area 102. The camera may include any number of image sensors for taking video and/or still images. Infrared and depth cameras are also contemplated.

The physical access control sensor 128 additionally or alternatively may be a proximity sensor. The proximity sensor can detect the presence of one or more users within the area 102 by emitting an electromagnetic field, such as infrared. The maximum detectable distance of the proximity sensor may be selected based upon the dimension of the area 102 being monitored.

The physical access control sensor 128 may send output 130 to the area access control system 114. The output 130, in some embodiments, may trigger the area access control system 114 to cause the wireless transceiver 120 to send a wireless component activation signal to one or more mobile devices within the area in an attempt to receive an identifier from the mobile device(s). The output 130 or at least a portion thereof may also be correlated with the appropriate user(s) in the user database 118 for later access, such as further information regarding the entry and exit trends of the users 104 into and out of the area 102 via the area entryway 106.

Figure 2:
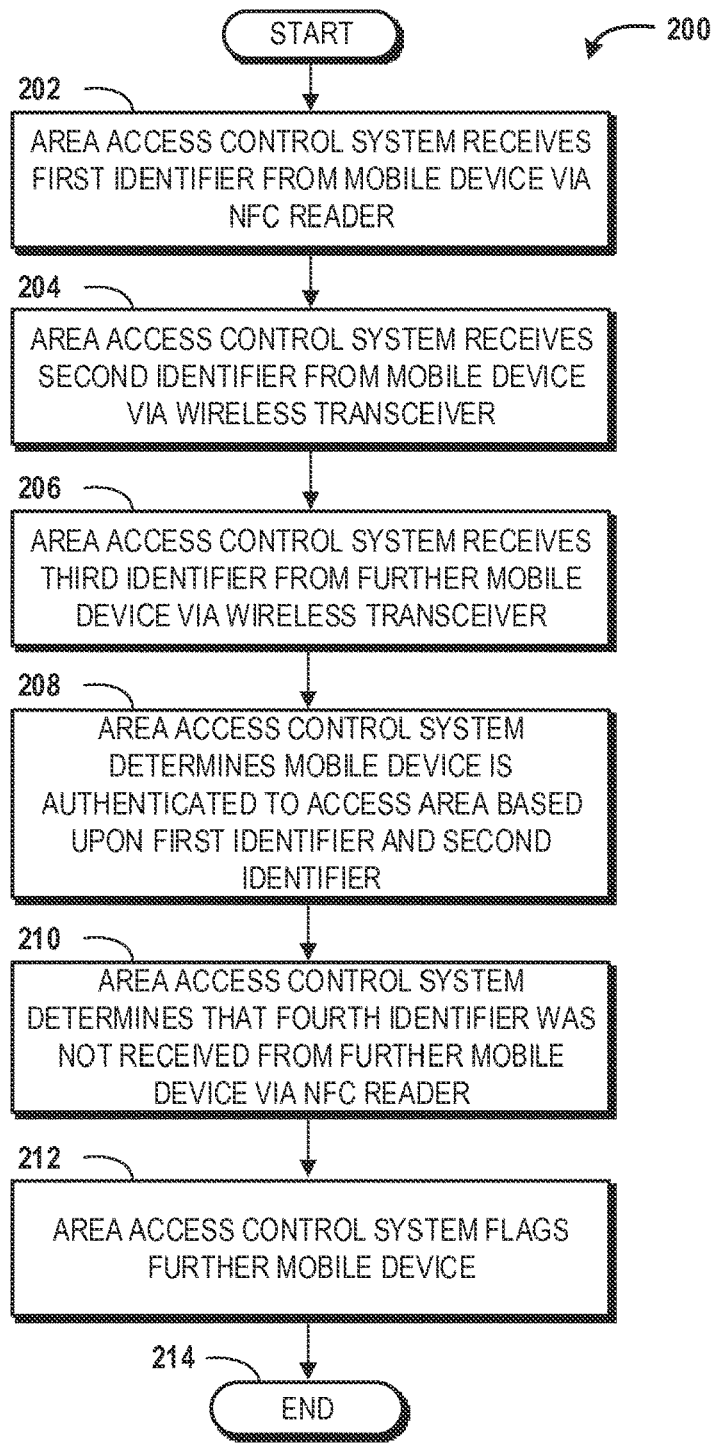
FIG. 2 is a flow diagram illustrating aspects of a method for providing physical access control to an area, according to an illustrative embodiment.

Turning now to FIG. 2, aspects of a method 200 for providing physical access control to an area will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as, the area entryway 106, the NFC reader 108, one or more of the mobile devices 110, the area access control system 114, the wireless transceiver 120, and/or the physical access control sensor 128 to perform one or more operations and/or causing the processor to direct other components of the computing system or device to perform one or more of the operations.

For purposes of illustrating and describing some of the concepts of the present disclosure, the methods disclosed herein are described as being performed, at least in part, by the area entryway 106, the NFC reader 108, one or more of the mobile devices 110, the area access control system 114, the wireless transceiver 120, the physical access control sensor 128, or a combination thereof, via execution of one or more software modules. It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 200 will be described with reference to FIG. 2 and further reference to FIG. 1. The method 200 begins at operation 202, where the area access control system 114 receives a first identifier, such as the identifier A 112A, from a mobile device, such as the mobile device A 110A, via the NFC reader 108. From operation 202, the method 200 proceeds to operation 204, where the area access control system 114 receives a second identifier, such as the identifier B 112B, from the mobile device A 110A via the wireless transceiver 120 of the area 102. From operation 204, the method 200 proceeds to operation 206, where the area access control system 114 receives a third identifier, such as the identifier C 112C, from a further mobile device, such as the mobile device B 110B, via the wireless transceiver 120 of the area 102.

From operation 206, the method 200 proceeds to operation 208, where the area access control system 114 determines that the mobile device A 110A is authenticated to access the area 102 based upon the identifier A 112A and the identifier B 112B forming an authentication pair. The authentication pair can be pre-selected and stored in the user database 118 in association with the user A 104A of the mobile device A 110A.

From operation 208, the method 200 proceeds to operation 210, where the area access control system 114 determines that a fourth identifier was not received from the mobile device B 110B via the NFC reader 108. In response, the method 200 proceeds to operation 212, where the area access control system 114 flags the user B 104B and the associated mobile device B 110B as failing to comply with a policy regarding proper entry into the area 102 by scanning in via the NFC reader 108. The flag may be stored in association with the user B 104B in the user database 118. It is contemplated that the flag or subsequent flags for a repeat offense may lead to the user B 104B being reprimanded in some way. For example, the user B 104B may be warned of their policy violation via email, text message, telephone call, or in-person.

From operation 212, the method 200 proceeds to operation 214. The method 200 ends at operation 214.

Figure 3:
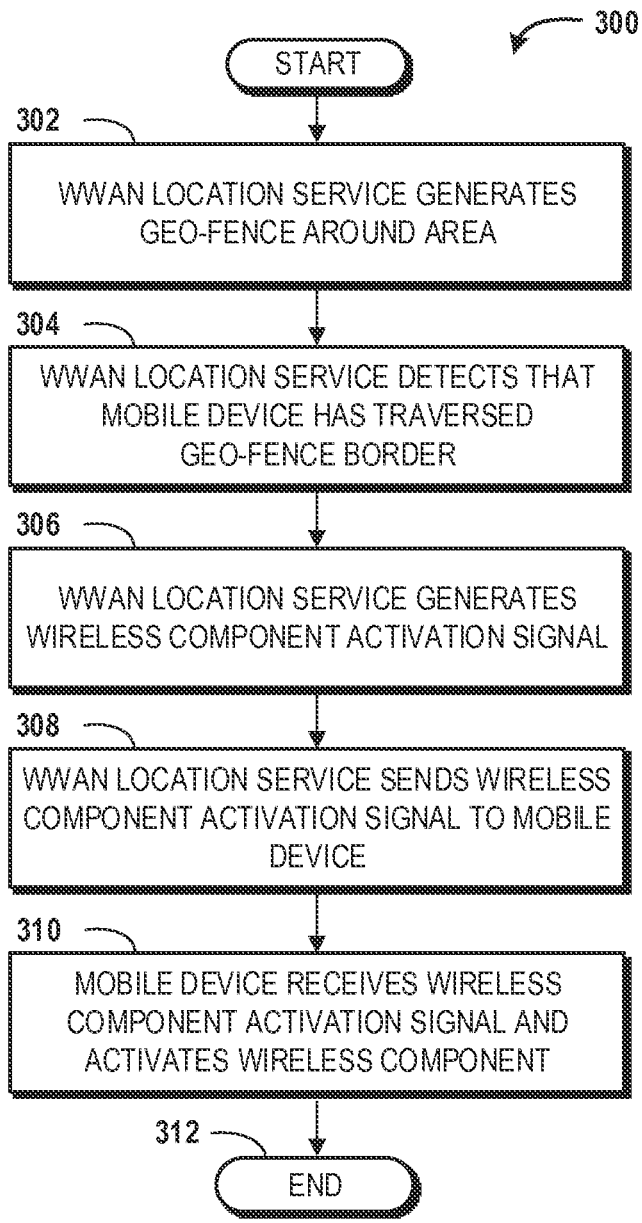
FIG. 3 is a flow diagram illustrating aspects of a method for remotely activating a wireless component of a mobile device via a location service, according to an illustrative embodiment.

Turning now to FIG. 3, a method 300 for remotely activating a wireless component of a mobile device via a location service will be described in detail, according to an illustrative embodiment. The method 300 will be described with reference to FIG. 3 and FIG. 1.

The method 300 begins and proceeds to operation 302, where a location service of a WWAN, such as the WWAN 124, generates a geo-fence around the area 102. The geo-fence may have any dimensions defined around the area entryway 106. The geo-fence may be created by a carrier associated with the WWAN 124 for one or more of the users 104 at the request of one or more of the users 104 and/or the area access control system 114. The area access control system 114 can communicate with the WWAN 124 via a network, such as the internet 126, to receive geo-fence information, such as, for example, location information that defines a perimeter around an area, which may include the area entryway 106 and/or the area 102 and potentially some distance away from the area entryway 106 and/or the area 102. The geo-fence may be defined using a location-based service provided at least in part via the WWAN 124 using GPS technology, assisted GPS ("A-GPS"), cellular triangulation, WI-FI triangulation, and/or other location determining techniques known to those skilled in the art.

From operation 304, the method 300 proceeds to operation 306, where the WWAN location service generates a wireless component activation signal. From operation 306, the method 300 proceeds to operation 308, where the WWAN location service sends the wireless component activation signal to a mobile device, such as one or more of the mobile devices 110, via the WWAN 124. The wireless component activation signal may be sent over a voice channel, a data channel, and/or a signaling channel, for example.

From operation 308, the method 300 proceeds to operation 310, where the mobile device receives the wireless component activation signal and activates a wireless component identified in the wireless component activation signal. For example, the wireless component activation signal may instruct the mobile device A 110A and the mobile device B 110B to activate the respective wireless components 122A, 122B when the mobile device A 110A and the mobile device B 110B cross the geo-fence generated at operation 302. From operation 310, the method 300 proceeds to operation 312. The method ends at operation 312.

The wireless component activation signal may distinguish between a number of available wireless communication technologies. For example, the wireless component activation signal may instruct the mobile device A 110A and the mobile device B 110B to activate a BLUETOOTH low energy wireless component, a ZIGBEE wireless component, a WI-FI wireless component, or a combination thereof.

As an alternative to the operations described above, one or more of the mobile device 110 may originate the wireless component activation signal in response to instructions received via one or more applications executing thereon, and/or in response to user input.

Figure 4:
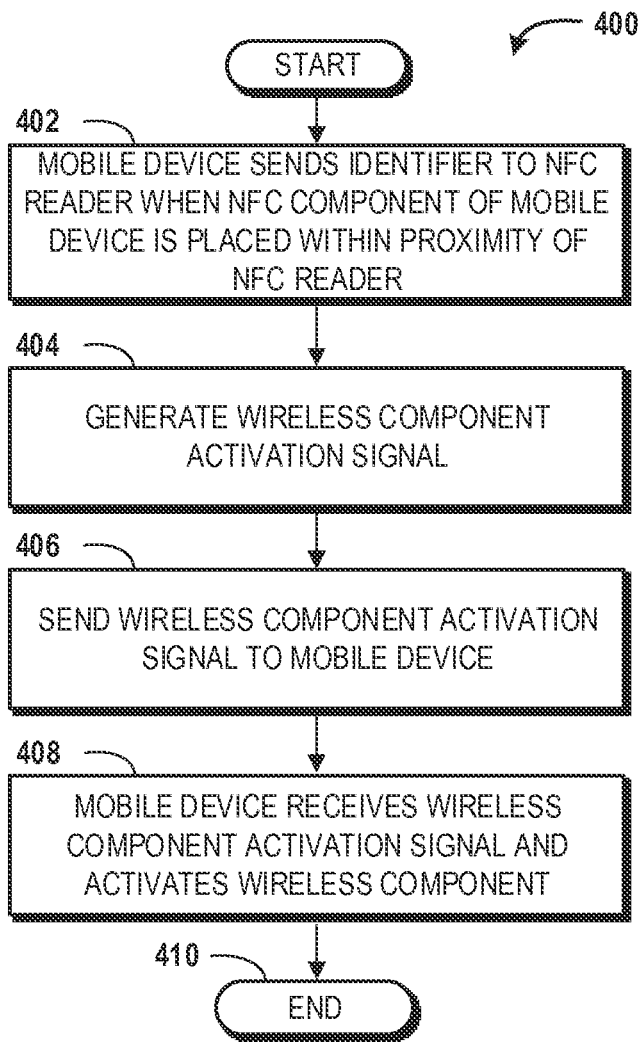
FIG. 4 is a flow diagram illustrating aspects of a method for remotely activating a wireless component of a mobile device, according to an illustrative embodiment.

Turning now to FIG. 4, a method 400 for remotely activating a wireless component of a mobile device will be described in detail, according to an illustrative embodiment. The method 400 will be described with reference to FIG. 4 and FIG. 1.

The method 400 begins and proceeds to operation 402, where a mobile device, such as the mobile device A 110A, sends an identifier, such as the identifier A 112A, to the NFC reader 108 when the NFC component of the mobile device, such as the NFC component A 111A, is placed within proximity (e.g., a few centimeters) of the NFC reader 108. From operation 402, the method 400 proceeds to operation 404, where a wireless component activation signal is generated. In some embodiments, the NFC reader 108 generates the wireless component activation signal. From operation 404, the method 400 proceeds to operation 406 where the wireless component activation signal is sent to the mobile device A 110A and potentially one or more other mobile devices, such as the mobile device B 110B, via the respective NFC components 111. The NFC reader 108 may be prompted to generate the wireless component activation signal by the area access control system 114. Alternatively, the area access control system 114 may generate the wireless component activation signal and send the wireless component activation signal to the NFC reader 108 via the LAN 116 so that the NFC reader 108 can send the wireless component activation signal to the mobile device(s). From operation 406, the method 400 proceeds to operation 408 where the mobile device A 110A and potentially one or more other mobile devices, such as the mobile device B 110B, receives the wireless component activation signal and activates the wireless component. From operation 408, the method 400 proceeds to operation 410. The method ends at operation 410.

As an alternative to the operations described above, one or more of the mobile device 110 may originate the wireless component activation signal in response to instructions received via one or more applications executing thereon, and/or in response to user input.

Figure 5:
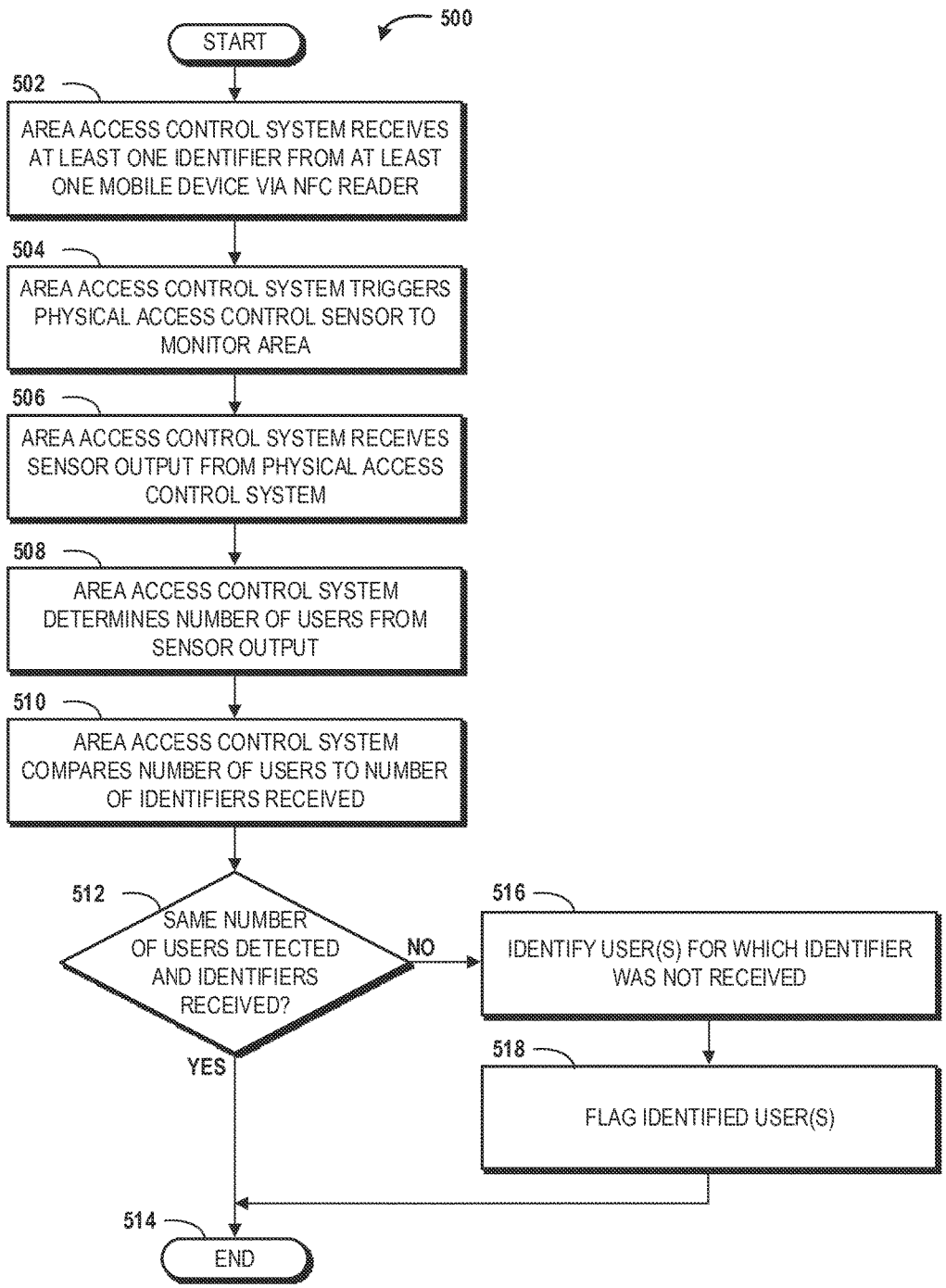
FIG. 5 is a flow diagram illustrating aspects of a method for monitoring an area for tailgating activity, according to an illustrative embodiment.

Turning now to FIG. 5, a method 500 for monitoring an area for tailgating activity will be described in detail, according to an illustrative embodiment. The method 500 will be described with reference to FIG. 5 and FIG. 1.

The method 500 begins and proceeds to operation 502, where the area access control system 114 receives at least one identifier from at least one mobile device via the NFC reader. Referring briefly to the example shown in FIG. 1, the area access control system 114 may receive the identifier A 112A from the mobile device A 110A via the NFC reader 108. From operation 502, the method 500 proceeds to operation 504, where the area access control system 114 triggers the physical access control sensor 128 to monitor the area 102. As described above, the physical access control sensor 128 may include a camera. The camera may be monitored by security personnel who can manually flag an individual that did not scan in via the NFC reader 108. The camera can additionally or alternatively include functionality to enable head detection for use in detecting the presence of the head of the users 104 when the users 104 are within the area 102. The head detection may be accompanied by a facial recognition technology to identify the individual(s) associated with the head(s) detected by the camera. The camera may additionally or alternatively provide motion sensing functionality, which may be utilized to isolate the number of individuals within the area 102. The camera may include any number of image sensors for taking video and/or still images. Infrared and depth cameras are also contemplated. The physical access control sensor 128 additionally or alternatively may be a proximity sensor.

From operation 504, the method 500 proceeds to operation 506, where the area access control system 114 receives a sensor output, such as the output 130. From operation 506, the method 500 proceeds to operation 508, where the area access control system 114 determines a number of users within the area 102 from the output 130. The method 500 then proceeds to operation 510, where the area access control system 114 compares the number of users determined at operation 508 to the number of identifiers received at operation 502.

From operation 510, the method 500 proceeds to operation 512, where the area access control system 114 determines, based upon the comparison at operation 510, whether the same number of users have been detected as the number of identifiers have been received. If so, the method 500 proceeds to operation 514. The method 500 ends at operation 514. If not, the method 500 proceeds to operation 516.

At operation 516, the area access control system 114 identifies the user(s) for which an identifier was not received at operation 502. From operation 516, the method 500 proceeds to operation 518, where the area access control system 114 flags the identified user(s). Turning again to the example shown in FIG. 1, the area access control system 114 can flag the user B 104B and the associated mobile device B 110B as failing to comply with a policy regarding proper entry into the area 102 by scanning in via the NFC reader 108. The flag may be stored in association with the user B 104B in the user database 118. It is contemplated that the flag or subsequent flags for a repeat offense may lead to the user B 104B being reprimanded in some way. For example, the user B 104B may be warned of their policy violation via email, text message, telephone call, or in-person.

From operation 518, the method 500 proceeds to operation 514. The method 500 ends at operation 514.

Figure 6:
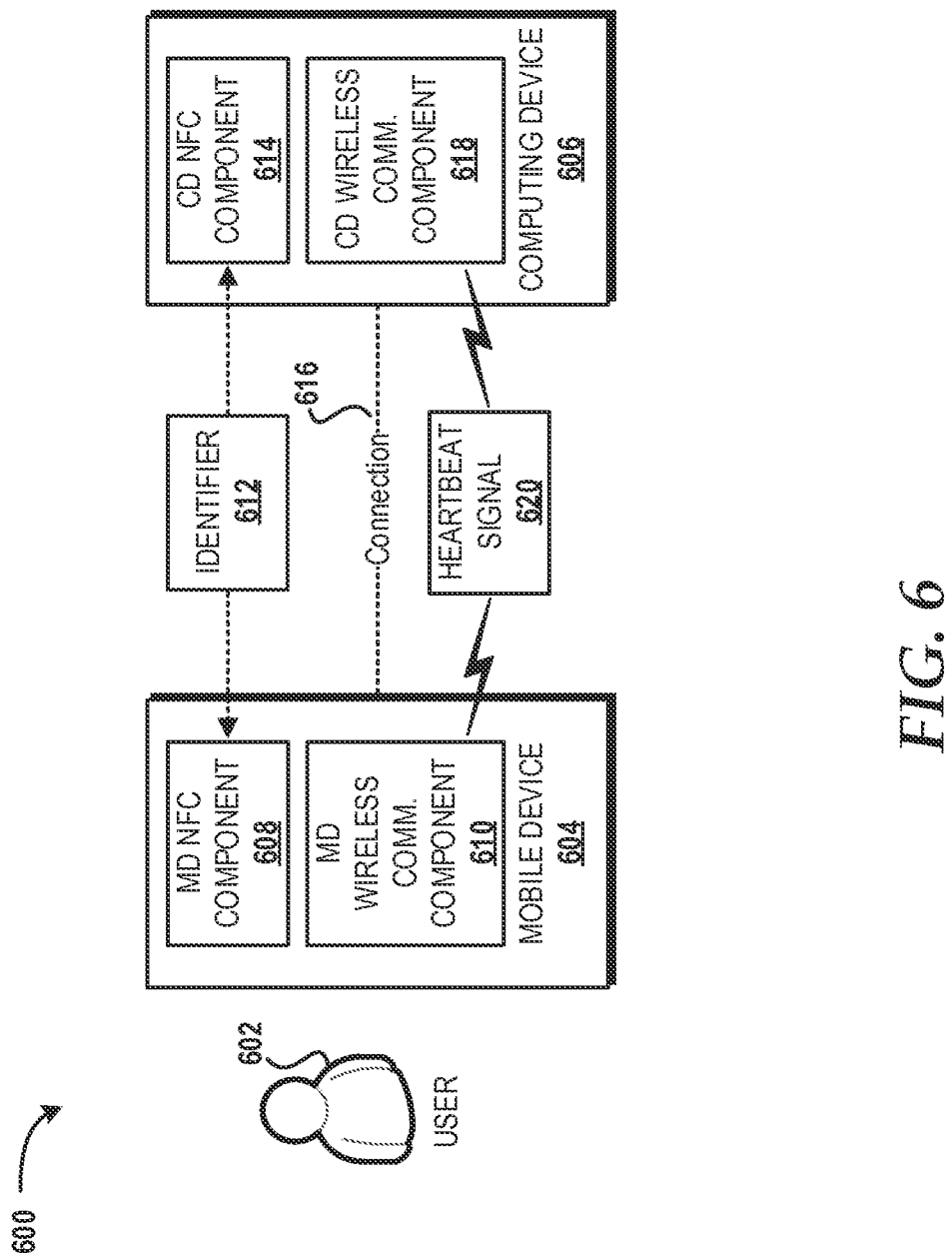
FIG. 6 is a block diagram illustrating aspects of another illustrative operating environment for various concepts disclosed herein.

Turning now to FIG. 6, aspects of another operating environment 600 for various embodiments of the concepts and technologies disclosed herein for secondary short-range wireless assist for wireless-based access control will be described, according to an illustrative embodiment. The operating environment 600 shown in FIG. 6 includes a user 602, a mobile device 604 associated with the user 602, and a computing device 606. The user 602 may desire to access information stored on or that is otherwise accessible via the computing device 606, and the computing device 606 may require one or more authentication credentials prior to powering on, logging into an operating system, launching an application, or otherwise allowing the user 602 to utilize the computing device 606. Rather than manually enter authentication credentials, the user 602 may utilize the mobile device 604, and more particularly, a mobile device NFC component 608 and a mobile device wireless communication component 610 to create a connection with the computing device 606 over which to share authentication credentials.

In the example shown in FIG. 6, the mobile device NFC component 608 sends an identifier 612 to a computing device NFC component 614 when the mobile device NFC component 608 is within proximity (e.g., a few centimeters) of the computing device NFC component 614. The identifier 612 may include one or more authentication credentials, such as, for example, a username, a password, a personal identification number, and/or the like, that is required by the computing device 606 to allow the user 602 to utilize the computing device 606.

In response to receiving the identifier 612 from the mobile device NFC component 608 and assuming the credential(s) contained in the identifier 612 are correct, the computing device 606 can establish a connection 616 to the mobile device 604. The computing device 606 also initiates a computing device wireless communication component 618, which generates a wireless heartbeat signal ("heartbeat signal") 620 and sends the heartbeat signal 620 to the mobile device wireless communication component 610 to maintain the connection 616. Meanwhile, the mobile NFC component 608 and the computing device NFC component 614 can be disconnected and powered down such that the mobile device 604 can be removed from proximity (e.g., a few centimeters) to the computing device 606 and the connection 616 is still maintained.

In some embodiments, the heartbeat signal 620 is sent periodically with a request for the identifier 612, in response to which the mobile device 604 must send the identifier 612 to the computing device 606 via the mobile device wireless communication component 610 in order to maintain the connection 616. The wireless technology utilized to provide the heartbeat signal 620 may be BLUETOOTH, BLUETOOTH low energy, or WI-FI. It should be understood that short-range wireless technologies other than NFC are contemplated for the heartbeat signal 620.

In the above-described manner, the user 602 can place his or her mobile device 604 in proximity to the computing device 606 to gain access to the computing device 606 and then remove the mobile device 604 from proximity to the computing device 606 (e.g., place the mobile device 604 back into their pocket). This allows a user to authenticate using NFC technology, but eliminates the requirement to maintain proximity between the mobile device 604 and computing device 606 so that, for example, the user 602 can use their mobile device 604 for other purposes, such as phone calls, surfing the web, using an application, or put the mobile device 604 away in a pocket, backpack, bag, or other location that is outside the operational distance of NFC technology.

Figure 7:
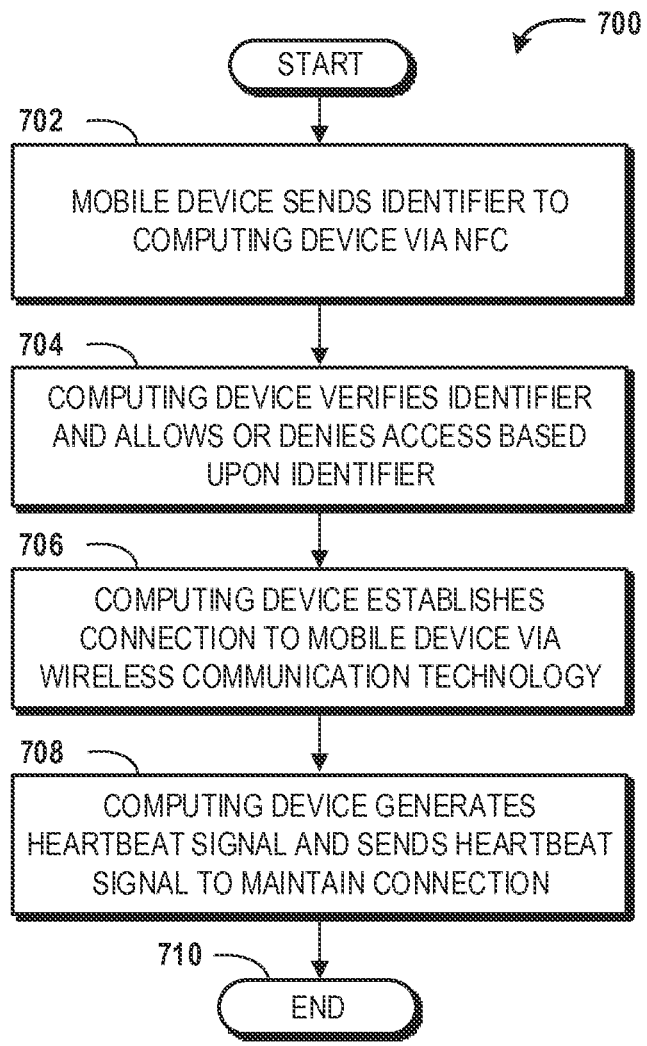
FIG. 7 is a flow diagram illustrating aspects of a method for information access control to a computing device, according to an illustrative embodiment.

Turning now to FIG. 7, a method 700 for information access control to a computing device will be described, according to an illustrative embodiment. The method 700 will be described with reference to FIG. 7 and FIG. 6.

The method 700 begins and proceeds to operation 702, where a mobile device, such as the mobile device 604, sends an identifier, such as the identifier 612, to a computing device, such as the computing device 606, via NFC. From operation 702, the method 700 proceeds to operation 704, where the computing device 606 verifies the identifier 612 and allows or denies access based upon the identifier 612.

Assuming the identifier 612 is appropriate for access to the computing device 606, at operation 706 the computing device 606 establishes a connection, such as the connection 616, to the mobile device 604 via another wireless communication technology, such as, for example, BLUETOOTH, BLUETOOTH low energy, or WI-FI. The method 700 then proceeds to operation 708, where the computing device 606 generates a heartbeat signal, such as the heartbeat signal 620, and sends the heartbeat signal 620 to the mobile device 604 to maintain the connection 616. From operation 708, the method 700 proceeds to operation 710. The method 700 ends at operation 710.

Figure 8:
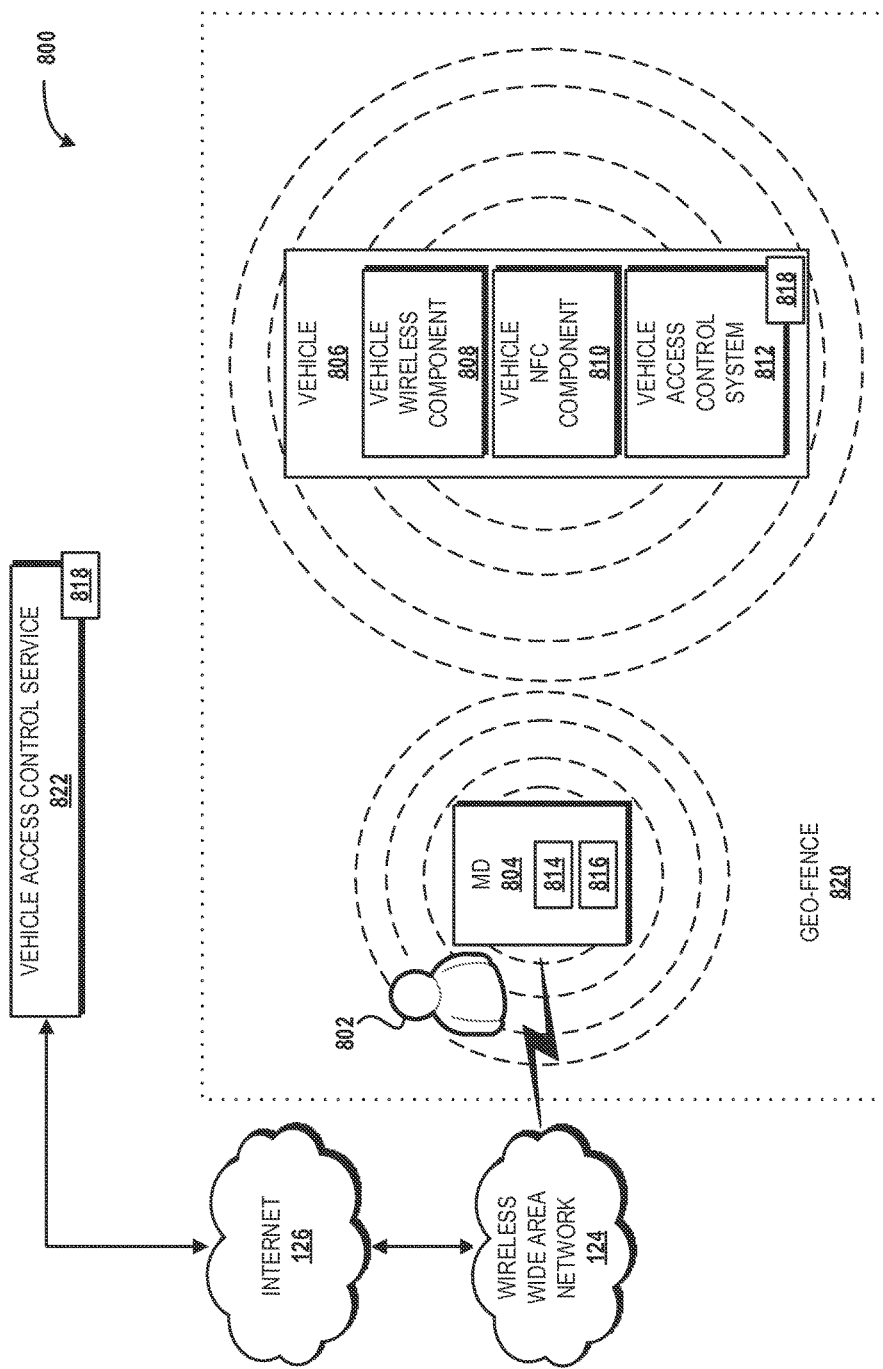
FIG. 8 is a block diagram illustrating aspects of another illustrative operating environment for various concepts described herein.

Turning now to FIG. 8, aspects of another operating environment 800 for various embodiments of the concepts and technologies disclosed herein for secondary short-range wireless assist for wireless-based access control will be described, according to an illustrative embodiment. The operating environment 800 shown in FIG. 8 includes a user 802, a mobile device 804 associated with the user 802, and a vehicle 806. The user 802 may desire to access the vehicle 806, such as to unlock and/or lock one or more doors of the vehicle 806, to unlock and/or lock a hood and/or a trunk of the vehicle 806, to open and/or close one or more doors, a hood, and/or a trunk of the vehicle 806, to start and/or stop the vehicle 806, and/or to control one or more operations of the vehicle 806, including the control of operations performed by any component(s) of the vehicle 806, which may be mechanical, electrical, or electro-mechanical, for example.

In the illustrated embodiment, the vehicle 806 includes a vehicle wireless component 808, a vehicle NFC component 810, and a vehicle access control system 812. The vehicle wireless component 808 can communicate with a device wireless component 814 of the mobile device 804 using a wireless communication technology, such as, for example, BLUETOOTH, BLUETOOTH low energy, ZIGBEE, or WI-FI. The vehicle NFC component 810 can communicate with a device NFC component 816 of the mobile device 804. The vehicle access control system 812 can communicate with the vehicle wireless component 808 and the vehicle NFC component 810 to receive authentication information provided to the vehicle 806 by the mobile device 804 so the user 802 can access the vehicle 806 to control one or more operations of the vehicle 806, as will be described in greater detail below with reference to FIG. 9.

In some embodiments, the vehicle access control system 812 is or includes an electronic control unit ("ECU") of the vehicle. Alternatively, the vehicle access control system 812 may be or may be integrated within a navigation unit, a stereo unit, a media player, a gauge cluster, or another component of the vehicle 806. The vehicle access control system 812 may be made available from a manufacturer of the vehicle 806 as factory-installed equipment, may be made available as dealer-installed equipment, and/or may be made available as aftermarket equipment.

The mobile device 804 can be paired with the vehicle 806 to establish an authentication pair 818. It is contemplated that the mobile device 804 and the vehicle 806 may establish the authentication pair 818 utilizing any pairing mechanism known to those skilled in the art to pair two devices, including proprietary pairing mechanisms and pairing mechanisms standardized for technologies such as, but not limited to, BLUETOOTH, BLUETOOTH low energy, ZIGBEE, WI-FI, and NFC. The pairing mechanism may utilize the vehicle wireless component 808 and the device wireless component 814, and/or the vehicle NFC component 810 and the device NFC component 816. In some embodiments, the authentication pair 818 includes a hardware identifier, a software identifier, or some combination thereof.

The vehicle access control system 812 may store the authentication pair 818 as shown, and alternatively or additionally may cause the authentication pair 818 to be stored in another location within the vehicle 806 or at a vehicle access control service 822 accessible by the vehicle 806 via the WWAN 124 and the internet 126, both of which are described in greater detail above with reference to FIG. 1. It should be understood that the vehicle 806 may include one or more WWAN transceivers (not shown) for providing the authentication pair 818 to the vehicle access control service 822 via the WWAN 124 or another network (not shown).

The embodiment illustrated in FIG. 8 also includes a geo-fence 820. The geo-fence 820 may be defined around the vehicle 806 and the mobile device 804 before, during, or after the vehicle 806 and the mobile device 804 are paired. The geo-fence 820 may be created at least in part by a location service provided by a carrier associated with the WWAN 124 at the request of the user 802, the mobile device 804, and/or the vehicle access control system 812. The geo-fence 820 may alternatively be created by the mobile device 804 and/or the vehicle 806.

After the geo-fence 820 is defined and the mobile device 804 and the vehicle 806 have been paired, the mobile device 804 can be utilized by the user 802 to access the vehicle 806 to perform one or more operations, as will now be described in greater detail below with reference to a method 900 illustrated in FIG. 9.

Figure 9:
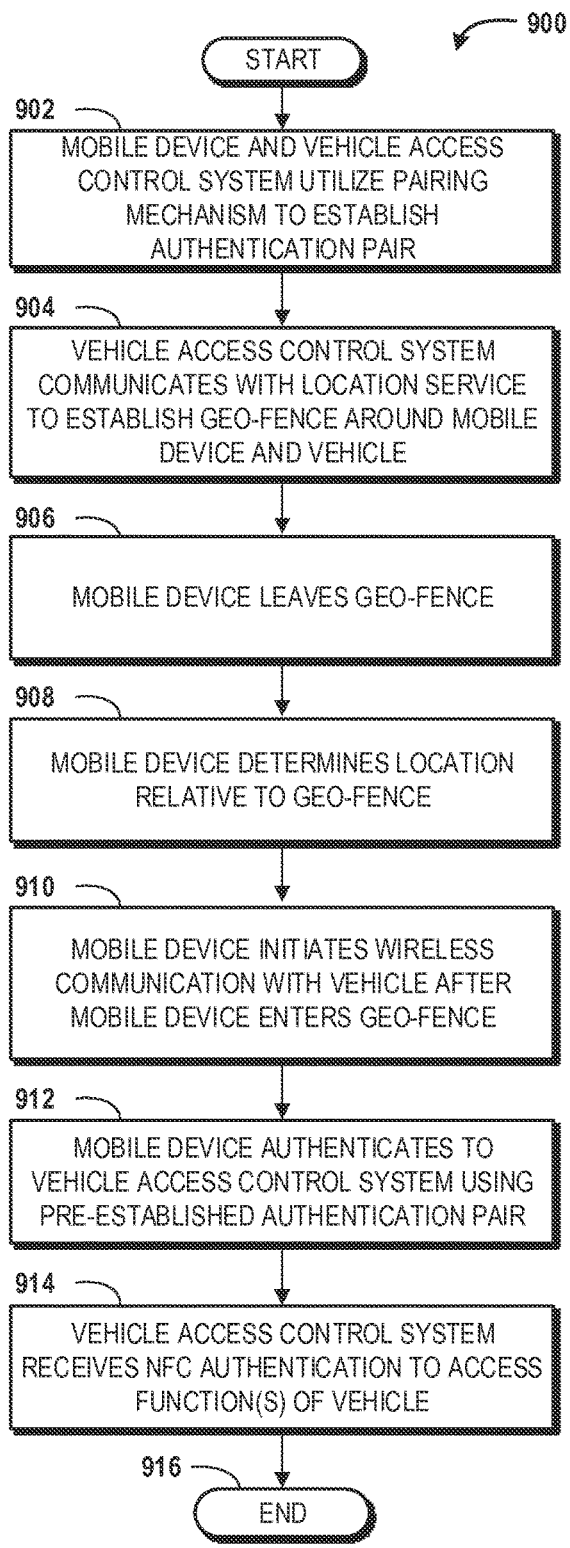
FIG. 9 is a flow diagram illustrating aspects of a method for access control to a vehicle, according to an illustrative embodiment.

FIG. 9 is a flow diagram illustrating the method 900 for access control to a vehicle, such as the vehicle 806, according to an illustrative embodiment. The method 900 will be described with reference to FIGS. 8 and 9. The method 900 begins at operation 902, where the mobile device 804 and the vehicle access control system 812 utilize a pairing mechanism, such as a pairing mechanism described above, to establish the authentication pair 818. The vehicle access control system 812 may then store the authentication pair 818 locally and/or send the authentication pair 818 to the vehicle access control service 822 for remote storage. The mobile device 804 may also store the authentication pair 818.

The user 802 may be required to provide one or more authentication credentials, such as, for example, a user name, PIN, password, biometric credential, or some combination thereof, to access one or more applications (not shown) executing on the mobile device 804 that facilitate access to the vehicle access control system 812. In some embodiments, the application(s) executing on the mobile device 804 do not require authentication credentials, but do require the mobile device 804 to be within a certain distance of the vehicle 806. This distance may be, for example, within an area defined by the geo-fence 820. This distance may alternatively be a distance dictated by the communication distance afforded by the device wireless component 814, the vehicle wireless component 808, the device NFC component 816, and/or the vehicle NFC component 810. In some embodiments, access to some functions of the vehicle 806 are permitted within the geo-fence 820, while others are only permitted when the user 802 is within the vehicle 806 such that, for example, the device NFC component 816 and the vehicle NFC component 810 are in close proximity to facilitate communication via NFC technology, such as when the vehicle NFC component 810 is present within the vehicle 806.

From operation 902, the method 900 proceeds to operation 904, where the vehicle access control system 812 communicates with a location service, such as a location service provided by the WWAN 124, to establish the geo-fence 820 around the mobile device 804 and the vehicle 806. Alternatively, the mobile device 804 may communicate with the location service to establish the geo-fence 820 around the mobile device 804 and the vehicle 806. The mobile device 804 and/or the vehicle 806 may utilize the device wireless component 814 and/or the vehicle wireless component 808 to establish the geo-fence 820.

From operation 904, the method 900 proceeds to operation 906, where the mobile device 804 leaves the geo-fence 820. It is contemplated that when the mobile device 804 leaves the geo-fence 820, the location service provided by the WWAN 124 may notify the vehicle access control service 822, which, in turn, may instruct the vehicle 806 to enter a mode of operation for when the user 802 is not attempting to access the vehicle 806. For example, the vehicle 806 may automatically lock a number of doors, trunks, and/or hoods, may close one or more windows, and/or may power off one or more electronics, lights, and/or other components of the vehicle 806. It is contemplated that this mode of operation, along with other modes of operation of the vehicle 806, may be provided as default, created by or for the user 802, or modified by or for the user 802.

From operation 906, the method 900 proceeds to operation 908, where the mobile device 804 determines a location relative to the geo-fence 820 that was pre-established around the mobile device 804 and the vehicle 806. The mobile device 804 may determine the location relative to the geo-fence 820 by using any location determining technique, including utilizing the location service provided by the WWAN 124 alone or in combination with other techniques, such as GPS.

From operation 908, the method 900 proceeds to operation 910, wherein the mobile device 804 initiates wireless communication with the vehicle 806 via the device wireless component 814 after the mobile device 804 enters the geo-fence 820. From operation 910, the method 900 proceeds to operation 912, where the mobile device 804 authenticates to the vehicle access control system 822 using the authentication pair 818 established at operation 902.

From operation 912, the method 900 proceeds to operation 914, where the vehicle access control system 812 receives NFC authentication from the mobile device 804 to access one or more functions of the vehicle 806. Operation 914 may be an optional authentication operation to allow the mobile device 804 access to one or more functions that are not made accessible via the authentication performed at operation 912 using the authentication pair 818. Alternatively, in some embodiments, the NFC authentication at operation 914 may be required by the vehicle access control system 812 to access the vehicle 806. In these embodiments, the vehicle NFC component may be built-in to a handle or other exterior component of the vehicle 806.

From operation 914, the method 900 proceeds to operation 916. The method 900 ends at operation 916.

Figure 10:
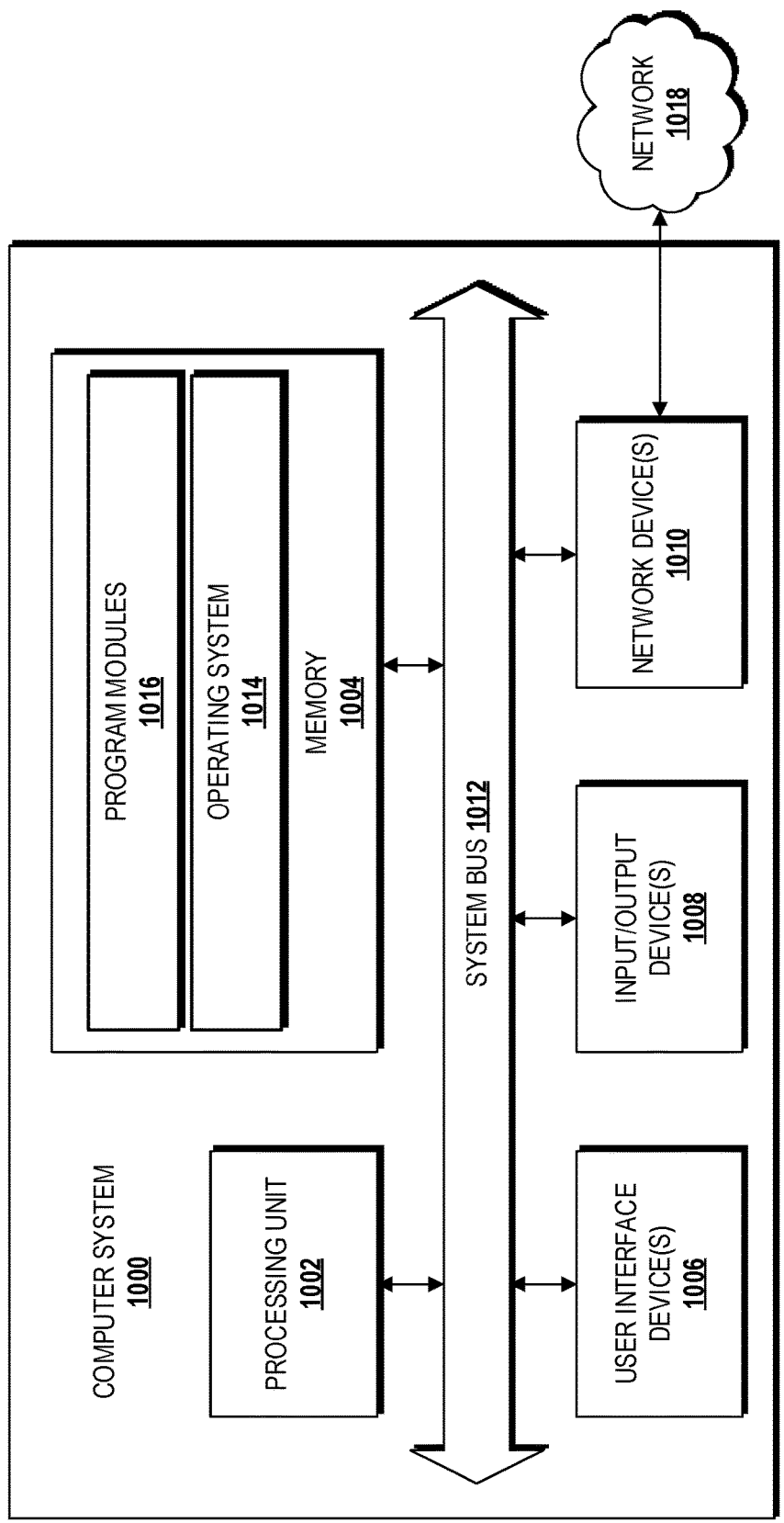
FIG. 10 is a block diagram illustrating an example computer system capable of implementing aspects of the embodiments presented herein.

FIG. 10 is a block diagram illustrating a computer system 1000 configured to provide the functionality in accordance with various embodiments of the concepts and technologies disclosed herein. In some implementations, the area access control system 114, one or more of the mobile device 110, the mobile device 604, the computing device 606, the mobile device 804, and/or the vehicle access control system 812 utilize an architecture that is the same as or similar to the architecture of the computer system 1000. It should be understood, however, that modification to the architecture may be made to facilitate certain interactions among elements described herein. For example, the area access control system 114 may be modified to include the user database 118. Other modifications are contemplated.

The computer system 1000 includes a processing unit 1002, a memory 1004, one or more user interface devices 1006, one or more input/output ("I/O") devices 1008, and one or more network devices 1010, each of which is operatively connected to a system bus 1012. The bus 1012 enables bi-directional communication between the processing unit 1002, the memory 1004, the user interface devices 1006, the I/O devices 1008, and the network devices 1010.

The processing unit 1002 may be a standard central processor that performs arithmetic and logical operations, a more specific purpose programmable logic controller ("PLC"), a programmable gate array, or other type of processor known to those skilled in the art and suitable for controlling the operation of the server computer. Processing units are generally known, and therefore are not described in further detail herein.

The memory 1004 communicates with the processing unit 1002 via the system bus 1012. In some embodiments, the memory 1004 is operatively connected to a memory controller (not shown) that enables communication with the processing unit 1002 via the system bus 1012. The memory 1004 includes an operating system 1014 and one or more program modules 1016. The operating system 1014 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 1016 may include various software and/or program modules to perform the various operations described herein, such as those described with reference to one or more of the methods 200, 300, 400, 500, 700. The program modules 1016 and/or other programs can be embodied in computer-readable media containing instructions that, when executed by the processing unit 1002, perform one or more of the methods 200, 300, 400, 500, 700, or a portion thereof, described in detail above with respect to FIGS. 2-5 and 7. According to embodiments, the program modules 1016 may be embodied in hardware, software, firmware, or any combination thereof. Although not shown in FIG. 10, it should be understood that the memory 1004 also can be configured to store the user database 118 and/or other data, if desired.

By way of example, and not limitation, computer-readable media may include any available computer storage media or communication media that can be accessed by the computer system 1000. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 1000. In the claims, the phrase "computer storage medium" and variations thereof does not include waves or signals per se and/or communication media.

The user interface devices 1006 may include one or more devices with which a user accesses the computer system 1000. The user interface devices 1006 may include, but are not limited to, computers, servers, personal digital assistants, cellular phones, or any suitable computing devices. The I/O devices 1008 enable a user to interface with the program modules 1016. In one embodiment, the I/O devices 1008 are operatively connected to an I/O controller (not shown) that enables communication with the processing unit 1002 via the system bus 1012. The I/O devices 1008 may include one or more input devices, such as, but not limited to, a keyboard, a mouse, or an electronic stylus. Further, the I/O devices 1008 may include one or more output devices, such as, but not limited to, a display screen or a printer.

The network devices 1010 enable the computer system 1000 to communicate with other networks or remote systems via a network 1018. Examples of the network devices 1010 include, but are not limited to, a modem, a radio frequency ("RF") or infrared ("IR") transceiver, a telephonic interface, a bridge, a router, or a network card. The network 1018 may include a wireless network such as, but not limited to, a Wireless Local Area Network ("WLAN") such as a wireless version of the LAN 116, a WWAN such as the WWAN 124, a Wireless Personal Area Network ("WPAN") such as provided via BLUETOOTH technology, a Wireless Metropolitan Area Network ("WMAN") such as a WiMAX network or metropolitan cellular network. Alternatively, the network 1018 may be a wired network such as, but not limited to, a Wide Area Network ("WAN") such as the internet 126, a wired version of the LAN 116 such as provided via Ethernet, a wired Personal Area Network ("PAN"), or a wired Metropolitan Area Network ("MAN").

Figure 11:
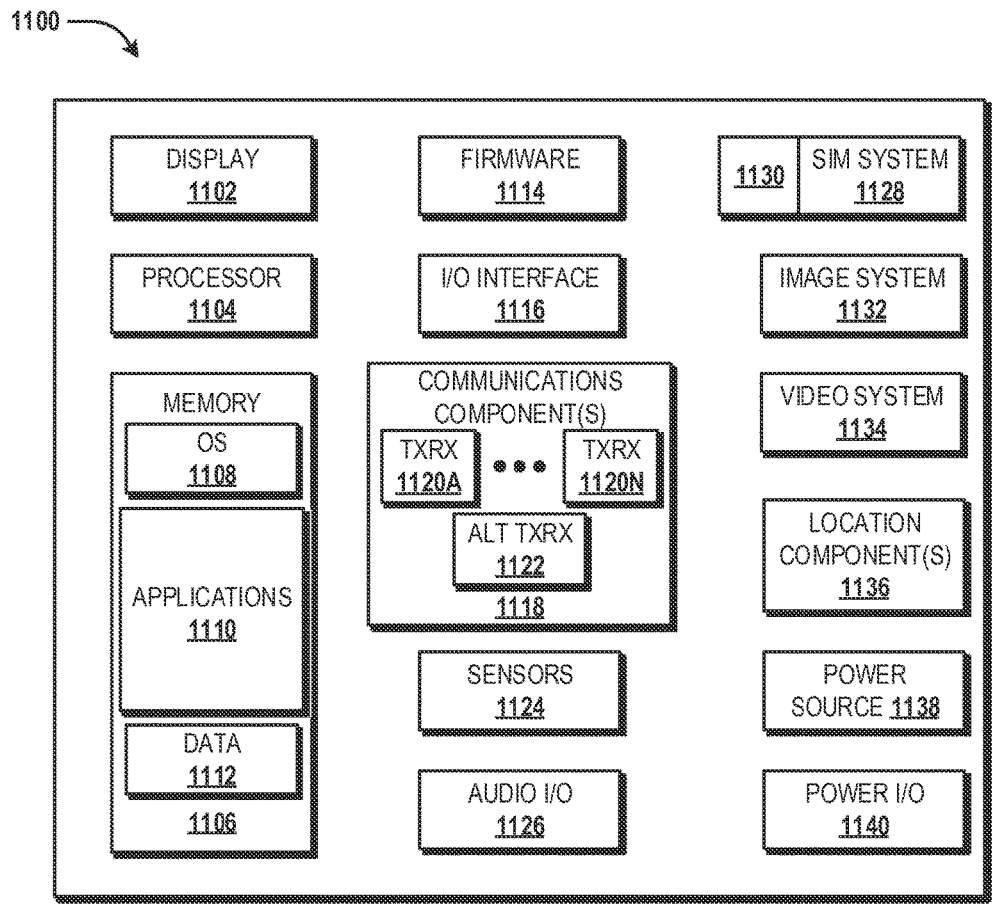
FIG. 11 is a block diagram illustrating an example mobile device capable of implementing aspects of the embodiments disclosed herein.

Turning now to FIG. 11, an illustrative mobile device 1100 and components thereof will be described. In some embodiments, the mobile devices 110, 604, 804 described above with reference to FIGS. 1, 6 and 8 can be configured as and/or can have an architecture similar or identical to the mobile device 1100 described herein in FIG. 11. It should be understood, however, that the mobile devices 110, 604, 804 may or may not include the functionality described herein with reference to FIG. 11. While connections are not shown between the various components illustrated in FIG. 11, it should be understood that some, none, or all of the components illustrated in FIG. 11 can be configured to interact with one other to carry out various device functions. In some embodiments, the components are arranged so as to communicate via one or more busses (not shown). Thus, it should be understood that FIG. 11 and the following description are intended to provide a general understanding of a suitable environment in which various aspects of embodiments can be implemented, and should not be construed as being limiting in any way.

As illustrated in FIG. 11, the mobile device 1100 can include a display 1102 for displaying data. According to various embodiments, the display 1102 can be configured to display various graphical user interface ("GUI") elements, text, images, video, virtual keypads and/or keyboards, messaging data, notification messages, metadata, internet content, device status, time, date, calendar data, device preferences, map and location data, combinations thereof, and/or the like. The mobile device 1100 also can include a processor 1104 and a memory or other data storage device ("memory") 1106. The processor 1104 can be configured to process data and/or can execute computer-executable instructions stored in the memory 1106. The computer-executable instructions executed by the processor 1104 can include, for example, an operating system 1108, one or more applications 1110, such as an NFC application, other computer-executable instructions stored in a memory 1106, or the like. In some embodiments, the applications 1110 also can include a UI application (not illustrated in FIG. 11).

The UI application can interface with the operating system 1108 to facilitate user interaction with functionality and/or data stored at the mobile device 1100 and/or stored elsewhere. In some embodiments, the operating system 1108 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 1104 to aid a user in entering content, viewing account information, answering/initiating calls, entering/deleting data, entering and setting user IDs and passwords for device access, configuring settings, manipulating address book content and/or settings, multimode interaction, interacting with other applications 1110, and otherwise facilitating user interaction with the operating system 1108, the applications 1110, and/or other types or instances of data 1112 that can be stored at the mobile device 1100. The data 1112 can include, for example, one or more identifiers, and/or other applications or program modules. According to various embodiments, the data 1112 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 1110, the data 1112, and/or portions thereof can be stored in the memory 1106 and/or in a firmware 1114, and can be executed by the processor 1104. The firmware 1114 also can store code for execution during device power up and power down operations. It can be appreciated that the firmware 1114 can be stored in a volatile or non-volatile data storage device including, but not limited to, the memory 1106 and/or a portion thereof.

The mobile device 1100 also can include an input/output ("I/O") interface 1116. The I/O interface 1116 can be configured to support the input/output of data such as location information, user information, organization information, presence status information, user IDs, passwords, and application initiation (start-up) requests. In some embodiments, the I/O interface 1116 can include a hardwire connection such as USB port, a mini-USB port, a micro-USB port, an audio jack, a PS2 port, an IEEE 13114 ("FIREWIRE") port, a serial port, a parallel port, an Ethernet (RJ45) port, an RJ11 port, a proprietary port, combinations thereof, or the like. In some embodiments, the mobile device 1100 can be configured to synchronize with another device to transfer content to and/or from the mobile device 1100. In some embodiments, the mobile device 1100 can be configured to receive updates to one or more of the applications 1110 via the I/O interface 1116, though this is not necessarily the case. In some embodiments, the I/O interface 1116 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 1116 may be used for communications between the mobile device 1100 and a network device or local device.

The mobile device 1100 also can include a communications component 1118. The communications component 1118 can be configured to interface with the processor 1104 to facilitate wired and/or wireless communications with one or more networks such as the network WWAN 124 and/or the LAN 116 described herein. In some embodiments, other networks include networks that utilize non-cellular wireless technologies such as WI-FI or WIMAX. In some embodiments, the communications component 1118 includes a multimode communications subsystem for facilitating communications via the cellular network and one or more other networks.

The communications component 1118, in some embodiments, includes one or more transceivers. The one or more transceivers, if included, can be configured to communicate over the same and/or different wireless technology standards with respect to one another. For example, in some embodiments one or more of the transceivers of the communications component 1118 may be configured to communicate using GSM, CDMAONE, CDMA2000, LTE, and various other 2G, 2.5G, 3G, 4G, and greater generation technology standards. Moreover, the communications component 1118 may facilitate communications over various channel access methods (which may or may not be used by the aforementioned standards) including, but not limited to, TDMA, FDMA, W-CDMA, OFDM, SDMA, and the like.

In addition, the communications component 1118 may facilitate data communications using GPRS, EDGE, the HSPA protocol family including HSDPA, EUL or otherwise termed HSUPA, HSPA+, and various other current and future wireless data access standards. In the illustrated embodiment, the communications component 1118 can include a first transceiver ("TxRx") 1120A that can operate in a first communications mode (e.g., GSM). The communications component 1118 also can include an N$^{th}$ transceiver ("TxRx") 1120N that can operate in a second communications mode relative to the first transceiver 1120A (e.g., UMTS). While two transceivers 1120A-N (hereinafter collectively and/or generically referred to as "transceivers 1120") are shown in FIG. 11, it should be appreciated that less than two, two, and/or more than two transceivers 1120 can be included in the communications component 1118.

The communications component 1118 also can include an alternative transceiver ("Alt TxRx") 1122 for supporting other types and/or standards of communications. According to various contemplated embodiments, the alternative transceiver 1122 can communicate using various communications technologies such as, for example, WI-FI, WIMAX, BLUETOOTH, infrared, IRDA, NFC, other RF technologies, combinations thereof, and the like. The Alt TxRx 1122 can include the NFC component 111 and/or the wireless communication component 122.

In some embodiments, the communications component 1118 also can facilitate reception from terrestrial radio networks, digital satellite radio networks, internet-based radio service networks, combinations thereof, and the like. The communications component 1118 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 1100 also can include one or more sensors 1124. The sensors 1124 can include temperature sensors, light sensors, air quality sensors, movement sensors, orientation sensors, noise sensors, proximity sensors, or the like. As such, it should be understood that the sensors 1124 can include, but are not limited to, accelerometers, magnetometers, gyroscopes, infrared sensors, noise sensors, microphones, combinations thereof, or the like. Additionally, audio capabilities for the mobile device 1100 may be provided by an audio I/O component 1126. The audio I/O component 1126 of the mobile device 1100 can include one or more speakers for the output of audio signals, one or more microphones for the collection and/or input of audio signals, and/or other audio input and/or output devices.

The illustrated mobile device 1100 also can include a subscriber identity module ("SIM") system 1128. The SIM system 1128 can include a universal SIM ("USIM"), a universal integrated circuit card ("UICC") and/or other identity devices. The SIM system 1128 can include and/or can be connected to or inserted into an interface such as a slot interface 1130. In some embodiments, the slot interface 1130 can be configured to accept insertion of other identity cards or modules for accessing various types of networks. Additionally, or alternatively, the slot interface 1130 can be configured to accept multiple subscriber identity cards. Because other devices and/or modules for identifying users and/or the mobile device 1100 are contemplated, it should be understood that these embodiments are illustrative, and should not be construed as being limiting in any way.

The mobile device 1100 also can include an image capture and processing system 1132 ("image system"). The image system 1132 can be configured to capture or otherwise obtain photos, videos, and/or other visual information. As such, the image system 1132 can include cameras, lenses, charge-coupled devices ("CCDs"), combinations thereof, or the like. The mobile device 1100 may also include a video system 1134. The video system 1134 can be configured to capture, process, record, modify, and/or store video content. Photos and videos obtained using the image system 1132 and the video system 1134, respectively, may be added as message content to an MMS message, email message, and sent to another mobile device. The video and/or photo content also can be shared with other devices via various types of data transfers via wired and/or wireless communication devices as described herein.

The mobile device 1100 also can include one or more location components 1136. The location components 1136 can be configured to send and/or receive signals to determine a geographic location of the mobile device 1100. According to various embodiments, the location components 1136 can send and/or receive signals from GPS devices, A-GPS devices, WI-FI/WIMAX and/or cellular network triangulation data, combinations thereof, and the like. The location component 1136 also can be configured to communicate with the communications component 1118 to retrieve triangulation data for determining a location of the mobile device 1100. In some embodiments, the location component 1136 can interface with cellular network nodes, telephone lines, satellites, location transmitters and/or beacons, wireless network transmitters and receivers, combinations thereof, and the like. In some embodiments, the location component 1136 can include and/or can communicate with one or more of the sensors 1124 such as a compass, an accelerometer, and/or a gyroscope to determine the orientation of the mobile device 1100. Using the location component 1136, the mobile device 1100 can generate and/or receive data to identify its geographic location, or to transmit data used by other devices to determine the location of the mobile device 1100. The location component 1136 may include multiple components for determining the location and/or orientation of the mobile device 1100.

The illustrated mobile device 1100 also can include a power source 1138. The power source 1138 can include one or more batteries, power supplies, power cells, and/or other power subsystems including alternating current ("AC") and/or direct current ("DC") power devices. The power source 1138 also can interface with an external power system or charging equipment via a power I/O component 1140. Because the mobile device 1100 can include additional and/or alternative components, the above embodiment should be understood as being illustrative of one possible operating environment for various embodiments of the concepts and technologies described herein. The described embodiment of the mobile device 1100 is illustrative, and should not be construed as being limiting in any way.

Based on the foregoing, it should be appreciated that concepts and technologies directed to secondary short-range wireless assist for wireless-based access control have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

I claim:

1. A method comprising:
    receiving, by an access control system comprising a processor, from a near field communication reader associated with an entryway that provides access to an area, a first identifier received by the near field communication reader from a near field communication component of a first mobile device associated with a first user;
    in response to receiving, from the near field communication reader, the first identifier provided by the near field communication component of the first mobile device associated with the first user, determining, by the access control system, based on the first identifier, whether the first user is allowed to physically access the area;
    in response to determining that the first user is allowed to physically access the area, causing, by the access control system, the entryway to be traversable by the first user to allow the first user and the first mobile device associated with the first user entry to the area through the entryway to physically access the area; and
    after the first user and the first mobile device have entered the area through the entryway,
        receiving, by the access control system, an output from a camera located within the area,
        in response to receiving the output from the camera located within the area, causing, by the access control system, a wireless transceiver located within the area to send a wireless component activation signal, wherein the wireless component activation signal sent by the wireless transceiver causes a wireless communication component of the first mobile device associated with the first user to activate so as to respond to any requests from the wireless transceiver and further causes a wireless communication component of a second mobile device associated with a second user to activate so as to respond to any requests from the wireless transceiver,
        receiving, by the access control system, from the wireless transceiver located within the area, a second identifier and a third identifier, wherein the second identifier is received by the wireless transceiver from the wireless communication component of the first mobile device associated with the first user in response to the wireless transceiver broadcasting a request for an additional identifier after the first mobile device has entered the area through the entryway, and wherein the third identifier is received by the wireless transceiver from the wireless communication component of the second mobile device associated with the second user in response to the wireless transceiver broadcasting the request for an additional identifier,
        determining, by the access control system, that the first identifier received by the near field communication reader from the near field communication component of the first mobile device associated with the first user and the second identifier received by the wireless transceiver from the wireless communication component of the first mobile device associated with the first user constitute a first authentication pair, wherein the first authentication pair identifies the first user of the first mobile device as being authenticated to access the area,
        determining, by the access control system, that a corresponding identifier from a near field communication component of the second mobile device associated with the second user, which along with the third identifier received by the wireless transceiver from the wireless communication component of the second mobile device associated with the second user constitute a second authentication pair, was not received from the near field communication reader, and
        in response to determining that a corresponding identifier from the near field communication component of the second mobile device associated with the second user was not received from the near field communication reader, flagging, by the access control system, the second user and the second mobile device as failing to comply with a policy regarding proper entry into the area requiring all mobile devices to be scanned in via the near field communication reader, wherein the second user tailgates the first user through the entryway into the area.

2. The method of claim 1, wherein flagging, by the access control system, the second user and the second mobile device as failing to comply with the policy regarding proper entry into the area comprises storing, in a user database, a flag in association with the second mobile device and the second user.

3. The method of claim 2, wherein the flag is utilized to identify the second user as in need of being reprimanded.

4. An access control system comprising:
a processor; and
a memory that stores computer-readable instructions that, when executed by the processor, cause the processor to perform operations comprising
receiving, from a near field communication reader associated with an entryway that provides access to an area, a first identifier received by the near field communication reader from a near field communication component of a first mobile device associated with a first user,
in response to receiving, from the near field communication reader, the first identifier provided by the near field communication component of the first mobile device associated with the first user, determining, based on the first identifier, whether the first user is allowed to physically access the area,
in response to determining that the first user is allowed to physically access the area, causing the entryway to be traversable by the first user to allow the first user and the first mobile device associated with the first user entry to the area through the entryway to physically access the area, and
after the first user and the first mobile device have entered the area through the entryway,
receiving an output from a camera located within the area,
in response to receiving the output from the camera located within the area, causing a wireless transceiver located within the area to send a wireless component activation signal, wherein the wireless component activation signal sent by the wireless transceiver causes a wireless communication component of the first mobile device associated with the first user to activate so as to respond to any requests from the wireless transceiver and causes a wireless communication component of a second mobile device associated with a second user to activate so as to respond to any requests from the wireless transceiver,
receiving, from the wireless transceiver located within the area, a second identifier and a third identifier, wherein the second identifier is received by the wireless transceiver from the wireless communication component of the first mobile device associated with the first user in response to the wireless transceiver broadcasting a request for an additional identifier after the first mobile device has entered the area through the entryway, and wherein the third identifier is received by the wireless transceiver from the wireless communication component of the second mobile device associated with the second user in response to the wireless transceiver broadcasting the request for an additional identifier,
determining that the first identifier received by the near field communication reader from the near field communication component of the first mobile device associated with the first user and the second identifier received by the wireless transceiver from the wireless communication component of the first mobile device associated with the first user constitute a first authentication pair, wherein the first authentication pair identifies the first user of the first mobile device as being authenticated to access the area,
determining that a corresponding identifier from a near field communication component of the second mobile device associated with the second user, which along with the third identifier received by the wireless transceiver from the wireless communication component of the second mobile device associated with the second user constitute a second authentication pair, was not received from the near field communication reader, and
in response to determining that a corresponding identifier from the near field communication component of the second mobile device associated with the second user was not received from the near field communication reader, flagging the second user and the second mobile device as failing to comply with a policy regarding proper entry into the area requiring all mobile devices to be scanned in via the near field communication reader, wherein the second user tailgates the first user through the entryway into the area.

5. The access control system of claim 4, wherein flagging the second user and the second mobile device as failing to comply with the policy regarding proper entry into the area comprises storing, in a user database, a flag in association with the second mobile device and the second user.

6. The access control system of claim 5, wherein the flag is utilized to identify the second user as in need of being reprimanded.

7. A computer-readable storage medium having instructions stored thereon that, when executed by a processor of an access control system, cause the access control system to perform operations comprising:
receiving, from a near field communication reader associated with an entryway that provides access to an area, a first identifier received by the near field communication reader from a near field communication component of a first mobile device associated with a first user;
in response to receiving, from the near field communication reader, the first identifier provided by the near field communication component of the first mobile device associated with the first user, determining, based on the first identifier, whether the first user is allowed to physically access the area;
in response to determining that the first user is allowed to physically access the area, causing the entryway to be traversable by the first user to allow the first user and the first mobile device associated with the first user entry to the area through the entryway to physically access the area; and
after the first user and the first mobile device have entered the area through the entryway,
receiving an output from a camera located within the area,
in response to receiving the output from the camera located within the area, causing a wireless transceiver located within the area to send a wireless component activation signal, wherein the wireless component activation signal sent by the wireless transceiver causes a wireless communication component of the first mobile device associated with the first user to activate so as to respond to any requests from the wireless transceiver and further causes a wireless communication component of a second mobile device associated with a second user to activate so as to respond to any requests from the wireless transceiver, receiving, from the wireless transceiver located within the area, a second identifier and a third identifier, wherein the second identifier is received by the wireless transceiver from the wireless communication component of the first mobile device associated with the first user in response to the wireless transceiver broadcasting a request for an additional identifier after the first mobile device has entered the area through the entryway, and wherein the third identifier is received by the wireless transceiver from the wireless communication component of the second mobile device associated with the second user in response to the wireless transceiver broadcasting the request for an additional, determining that the first identifier received by the near field communication reader from the near field communication component of the first mobile device associated with the first user and the second identifier received by the wireless transceiver from the wireless communication component of the first mobile device associated with the first user constitute a first authentication pair, wherein the first authentication pair identifies the first mobile device as being authenticated to access the area, determining that a corresponding identifier from a near field communication component of the second mobile device associated with the second user, which along with the third identifier received by the wireless transceiver from the wireless communication component of the second mobile device associated with the second user constitute a second authentication pair, was not received from the near field communication reader, and in response to determining that a corresponding identifier from the near field communication component of the second mobile device associated with the second user was not received from the near field communication reader, flagging the second user and the second mobile device as failing to comply with a policy regarding proper entry into the area requiring all mobile devices to scan in via the near field communication reader, wherein the second user tailgates the first user through the entryway into the area.

8. The computer-readable storage medium of claim 7, wherein flagging the second user and the second mobile device as failing to comply with the policy regarding proper entry into the area comprises storing, in a user database, a flag in association with the second mobile device and the second user, and wherein the flag is utilized to identify the second user as in need of being reprimanded.

* * * * *